(12) United States Patent
Funasaka et al.

(10) Patent No.: US 8,110,963 B2
(45) Date of Patent: Feb. 7, 2012

(54) ULTRASONIC TRANSDUCER, ULTRASONIC TRANSDUCER ARRAY, AND ULTRASONIC DEVICE

(75) Inventors: Tsukasa Funasaka, Nagano (JP); Tomoaki Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 238 days.

(21) Appl. No.: 12/638,285

(22) Filed: Dec. 15, 2009

(65) Prior Publication Data

US 2010/0148627 A1 Jun. 17, 2010

(30) Foreign Application Priority Data

Dec. 17, 2008 (JP) ................................ 2008-320954
Oct. 23, 2009 (JP) ................................ 2009-244429

(51) Int. Cl.
*H01L 41/047* (2006.01)
(52) U.S. Cl. ........ 310/324; 310/322; 310/334; 310/365; 310/369
(58) Field of Classification Search ............. 310/322, 310/324, 334, 365, 366, 369
See application file for complete search history.

(56) References Cited

U.S. PATENT DOCUMENTS

| | | | | |
|---|---|---|---|---|
| 4,170,742 A * | 10/1979 | Itagaki et al. | ................. | 310/324 |
| 7,290,336 B2 * | 11/2007 | Buhler et al. | ................. | 29/890.1 |
| 7,343,655 B2 * | 3/2008 | Mehta | ............................ | 29/25.35 |
| 7,538,477 B2 * | 5/2009 | Fazzio et al. | ................... | 310/366 |
| 7,795,692 B2 * | 9/2010 | Lee et al. | ........................ | 257/416 |
| 2005/0200241 A1 * | 9/2005 | Degertekin | ..................... | 310/334 |
| 2005/0248238 A1 * | 11/2005 | Yamada et al. | ................ | 310/366 |
| 2007/0182594 A1 * | 8/2007 | Face et al. | ......................... | 341/20 |
| 2008/0225379 A1 * | 9/2008 | Mescher | ........................ | 359/319 |
| 2009/0289998 A1 * | 11/2009 | Tanaka et al. | .................... | 347/68 |

FOREIGN PATENT DOCUMENTS

| | | |
|---|---|---|
| JP | 2005-39720 A | 2/2005 |
| JP | 2005-51686 A | 2/2005 |
| JP | 2005-117103 A | 4/2005 |
| JP | 2006-319945 A | 11/2006 |
| JP | 2008-206333 A | 9/2008 |

* cited by examiner

*Primary Examiner* — Thomas M Dougherty

(74) *Attorney, Agent, or Firm* — Global IP Counselors, LLP

(57) ABSTRACT

An ultrasonic transducer is configured to transmit or receive ultrasonic waves. The ultrasonic transducer includes a vibrating member and a piezoelectric member coupled to the vibrating member. The piezoelectric member includes a first piezoelectric part configured and arranged to be deformed by applied voltage to vibrate the vibrating member or configured and arranged to be deformed by vibration of the vibrating member to produce a potential difference, and a second piezoelectric part configured and arranged to be deformed by applied voltage to statically deflect the vibrating member.

10 Claims, 8 Drawing Sheets

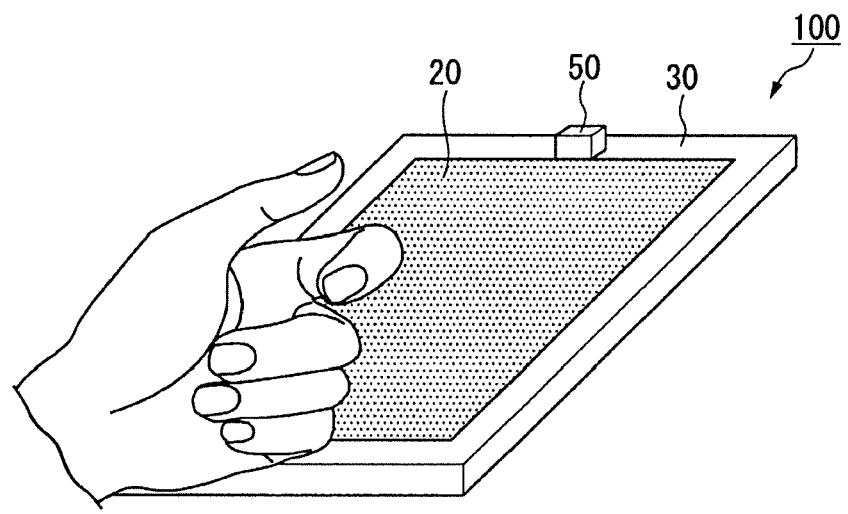
F I G. 1
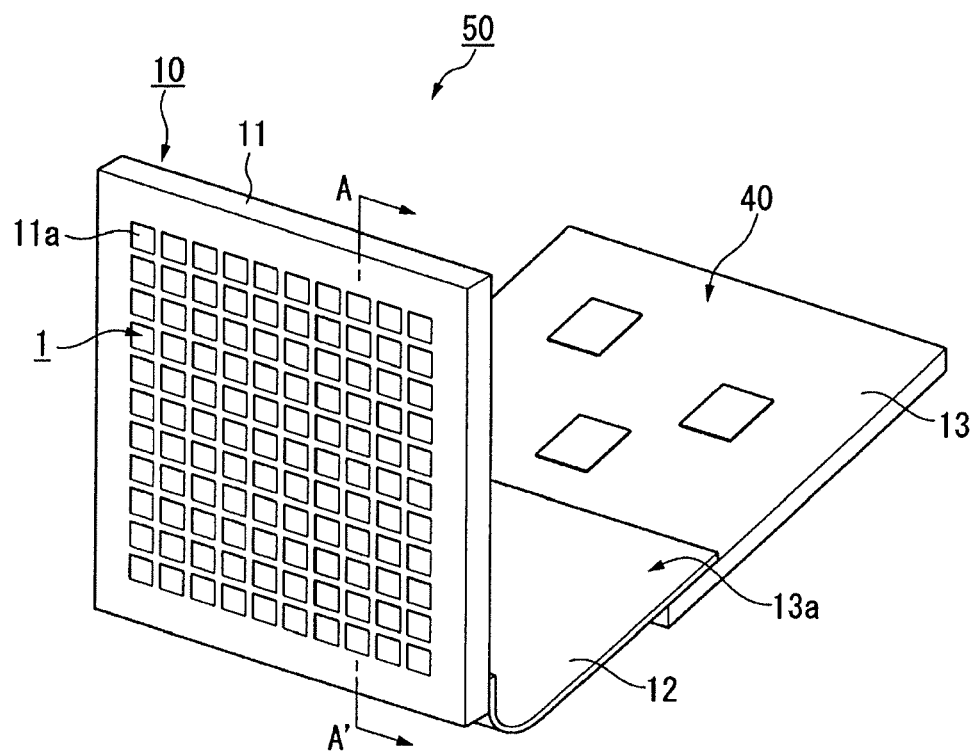
F I G. 2

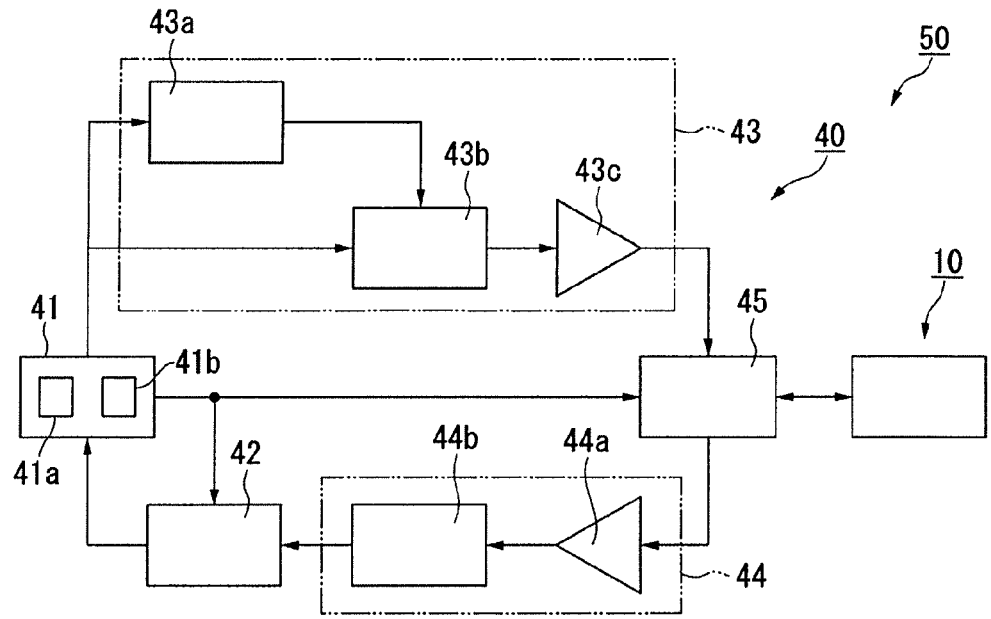
F I G. 3
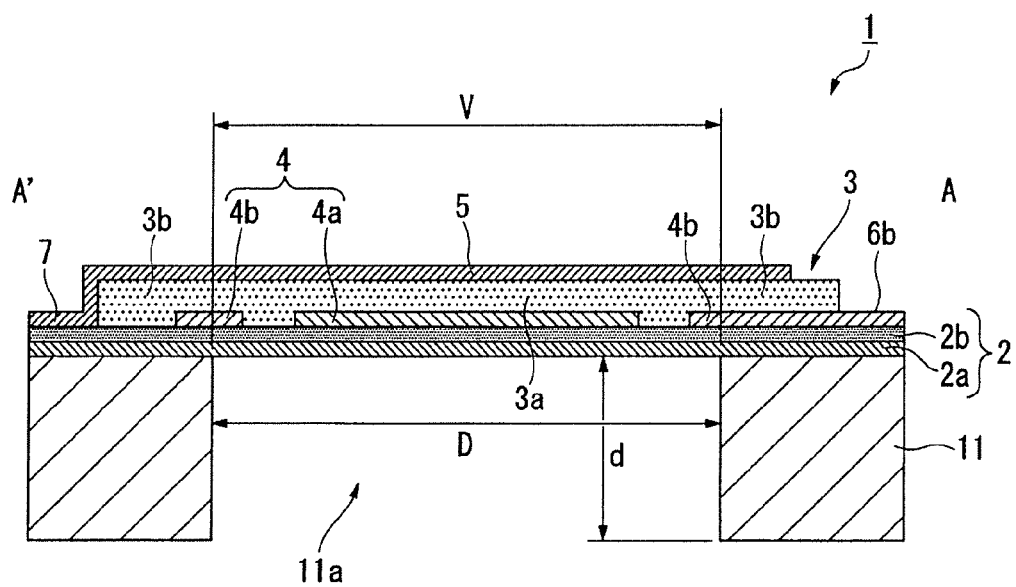
F I G. 4

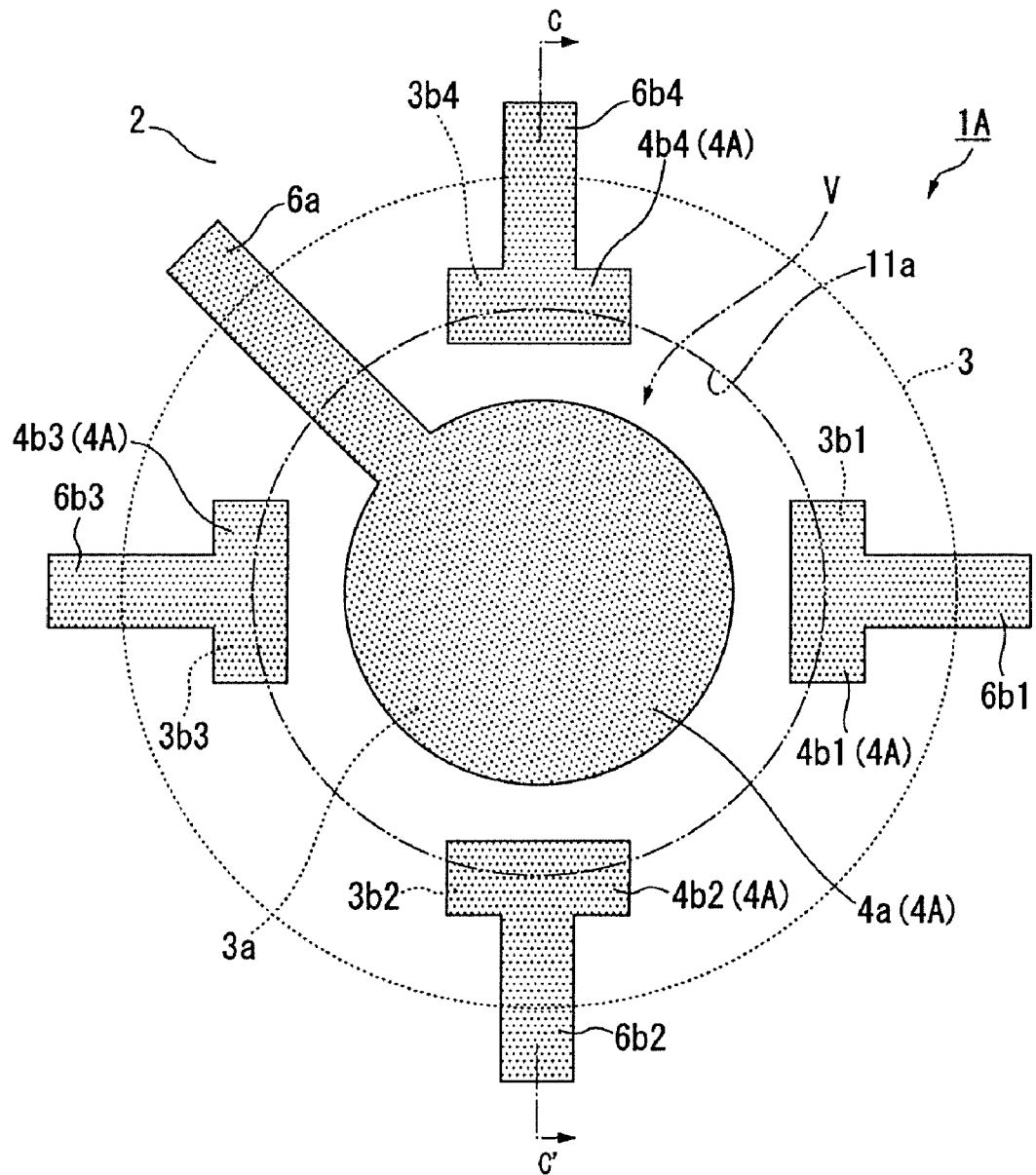
F I G. 7

ULTRASONIC TRANSDUCER, ULTRASONIC TRANSDUCER ARRAY, AND ULTRASONIC DEVICE

CROSS-REFERENCE TO RELATED APPLICATIONS

This application claims priority to Japanese Patent Application No. 2008-320954 filed on Dec. 17, 2008 and Japanese Patent Application No. 2009-244429 filed on Oct. 23, 2009. The entire disclosures of Japanese Patent Application Nos. 2008-320954 and 2009-244429 are hereby incorporated herein by reference.

BACKGROUND

1. Technical Field

The present invention relates to an ultrasonic transducer, ultrasonic transducer array, and ultrasonic device.

2. Related Art

Diaphragm-type ultrasonic sensors are conventionally known. In this type of ultrasonic sensor, a PZT ceramic thin film layer flanked by two electrodes is formed on one side of a diaphragm, and the electrical signals output from the electrodes are used to detect ultrasonic waves (see, for example, Japanese Laid-Open Patent Application 2006-319945).

In the ultrasonic sensor in Patent Document 1, buckling caused by internal stress of the diaphragm, which has a multi-layered film, is exploited to apply pressure in the upper direction of the diaphragm, thereby statically deflecting the diaphragm so that the diaphragm becomes convex in the upper direction.

SUMMARY

However, a problem with the conventional ultrasonic sensor noted above is that the stress for deflecting the diaphragm is difficult to control because the diaphragm is deflected depending on the diaphragm film formation conditions and the like, and the properties vary from sensor to sensor. Another problem is that the level of diaphragm deflection varies as the diaphragm temperature varies, resulting in unstable properties. Yet another problem is that the transmission and reception properties are difficult to optimize because of changes in the shape of the diaphragm after the formation of the ultrasonic sensor.

According to various aspects of the present invention, an ultrasonic transducer, an ultrasonic transducer array, and an ultrasonic device are provided in which the properties can be made uniform and stable and in which the ultrasonic wave transmission properties and reception properties can be easily optimized.

According to a first aspect, an ultrasonic transducer configured to transmit or receive ultrasonic waves, and the ultrasonic transducer includes a vibrating member, and a piezoelectric member coupled to the vibrating member. The piezoelectric member includes a first piezoelectric part configured and arranged to be deformed by applied voltage to vibrate the vibrating member or configured and arranged to be deformed by vibration of the vibrating member to produce a potential difference, and a second piezoelectric part configured and arranged to be deformed by applied voltage to statically deflect the vibrating member.

Here, the ultrasonic transducer is an element which converts received ultrasonic waves into electrical signals, and/or converts input electrical signals into ultrasonic waves, and transmits the signals or waves, and includes, for example, ultrasonic sensors and ultrasonic transmission elements.

Configuring the ultrasonic transducer in this way allows the level and direction of the static deflection of the vibrating member (e.g., a diaphragm) to be controlled by voltage applied to the second piezoelectric part. It is thereby possible to make the ultrasonic transducer properties uniform and stable. The deflection of the vibrating member refers to two phenomena: the phenomenon of the elastic deformation of the vibrating member (and first piezoelectric part), and the phenomenon of the changes in the state of the stress in the vibrating member. That is, when the vibrating member is vibrated by the first piezoelectric part, the level of deflection (change in state of stress) of the vibrating member or the direction of deflection (distribution of stress) of the vibrating member can be controlled by the second piezoelectric part, thereby allowing the ultrasonic directionality or transmission properties of the ultrasonic transducer to be controlled. The level and direction of deflection of the vibrating member can also be controlled by the second piezoelectric part to control the vibrating state of the vibrating member produced by the ultrasonic waves that are incident on the vibrating member, and to control the potential difference produced by the deformation of the first piezoelectric part. It is thus possible to control the ultrasonic reception properties of the ultrasonic transducer.

According to the ultrasonic transducer of the first aspect, the properties can thus be made uniform and stable, and the ultrasonic transmission and reception properties can be easily optimized.

In the ultrasonic transducer according to the second aspect, the first piezoelectric part and the second piezoelectric part may be integrally formed with each other. The first piezoelectric part may be connected to a first electrode and the second piezoelectric part may be connected to a second electrode with the first electrode and the second electrode being separated from each other.

Configuring the ultrasonic transducer in this way allows different voltage to be applied to the first and second piezoelectric parts, and allows the first and second piezoelectric parts to be driven independently. In addition, the potential difference produced by the first piezoelectric part can be detected by means of vibration of the vibrating member while the vibrating member is statically deflected by the second piezoelectric part. The piezoelectric member can also be easily manufactured, ultrasonic transducer productivity can be improved, and the manufacturing costs of the ultrasonic transducer can be reduced.

The ultrasonic transducer according to a third aspect further includes a base having an opening. The vibrating member may cover the opening of the base. The first and second piezoelectric parts may be disposed on one side of the vibrating member opposite from the base. The first and second piezoelectric parts may be disposed in an oscillation region that overlaps the opening of the base when viewed in a direction perpendicular to a main surface of the vibrating member.

Configuring ultrasonic transducer in this way allows the vibrating member to be supported by the base and allows only the oscillation region of the vibrating member to be vibrated. The natural frequency of the vibrating member in the oscillation region can also be adjusted depending on the size and shape of the opening. It is also possible to vibrate the oscillation region of the vibrating member by means of the first piezoelectric part or to deform the first piezoelectric part by means of the vibration of the oscillation region of the vibrating member while the oscillation region of the vibrating member is statically deflected by the second piezoelectric part.

In the ultrasonic transducer according to a fourth embodiment, the first piezoelectric part may be disposed in a center portion of the oscillation region, and the second piezoelectric part may be disposed on the periphery of the first piezoelectric part.

Configuring the ultrasonic transducer in this way allows the circumference of the vibrating member to be deformed by the second piezoelectric part and allows the vibrating member in the oscillation region to be deflected in a convex or concave manner on the base side. The convexly or concavely deflected vibrating member can be vibrated by the first piezoelectric part, or the first piezoelectric part can be deformed by the vibration of the convexly or concavely deflected vibrating member.

In the ultrasonic transducer according to a fifth aspect, the second piezoelectric part may be disposed adjacent to a boundary of the oscillation region.

Configuring the ultrasonic transducer in this way allows the area bordering the oscillation region of the vibrating member to be deformed and allows the oscillation region of the vibrating member to be more efficiently deflected convexly or concavely on the base side.

In the ultrasonic transducer according to a sixth aspect, the second piezoelectric part may include a plurality of piezoelectric components.

Configuring the ultrasonic transducer in this way allows the deformed state of the individual second piezoelectric parts to be varied and allows the oscillation region to be deformed into a desired shape.

The ultrasonic transducer array according to a seventh aspect includes a plurality of the ultrasonic transducers according to any of the aspects described above.

Configuring the ultrasonic transducer array in this way allows the ultrasonic transducer properties provided to the ultrasonic transducer array to be made uniform and stable and allows the ultrasonic transmission and reception properties to be easily optimized.

Therefore, according to the ultrasonic transducer array according to the seventh aspect, the ultrasonic transducer array properties can be made uniform and stable, and the ultrasonic transmission and reception properties can be easily optimized.

The ultrasonic device according to an eighth aspect includes the ultrasonic transducer or the ultrasonic transducer array according to any of the above aspects, and includes a control unit configured to control input signals input to the ultrasonic transducer and to process output signals output from the ultrasonic transducer.

Configuring the ultrasonic device in this way allows ultrasonic waves to be transmitted by any ultrasonic transducer and allows ultrasonic waves to be received by the other ultrasonic transducers. Additionally, after ultrasonic waves have been transmitted by individual ultrasonic transducers, ultrasonic waves reflected on an object that is to be detected can be detected by individual ultrasonic transducers.

In the ultrasonic device according to the ninth aspect, the control unit may have a first control part configured to control the voltage applied to the first piezoelectric part and to process the potential difference produced by the first piezoelectric part, and a second control part configured to control the voltage applied to the second piezoelectric part.

Configuring the ultrasonic device in this way allows the first and second controllers to be independently operated and allows the first and second piezoelectric parts to be independently controlled.

In the ultrasonic device according to a tenth aspect, the first control part and the second control part may be configured to be controlled independently from each other.

Configuring the ultrasonic device in this way allows the voltage applied to the second piezoelectric part to be controlled by the second controller according to the potential difference of the first piezoelectric part processed by the first controller, and allows voltage applied to the first piezoelectric part to be controlled according to the voltage applied to the second piezoelectric part.

BRIEF DESCRIPTION OF THE DRAWINGS

Referring now to the attached drawings which form a part of this original disclosure:

FIG. 1 is a perspective view of a PDA in a first embodiment of the present invention;

FIG. 2 is a perspective view of an ultrasonic transducer array and ultrasonic transducer device in the first embodiment of the present invention;

FIG. 3 is a system configuration diagram of the controllers of the ultrasonic transducer array device shown in FIG. 2;

FIG. 4 is a cross sectional view of an ultrasonic transducer along line A-A' in FIG. 2;

FIG. 7 is a plan of the bottom electrode of the ultrasonic transducer in a second embodiment of the present invention;

DETAILED DESCRIPTION OF EXEMPLARY EMBODIMENTS

First Embodiment

Figure 5:
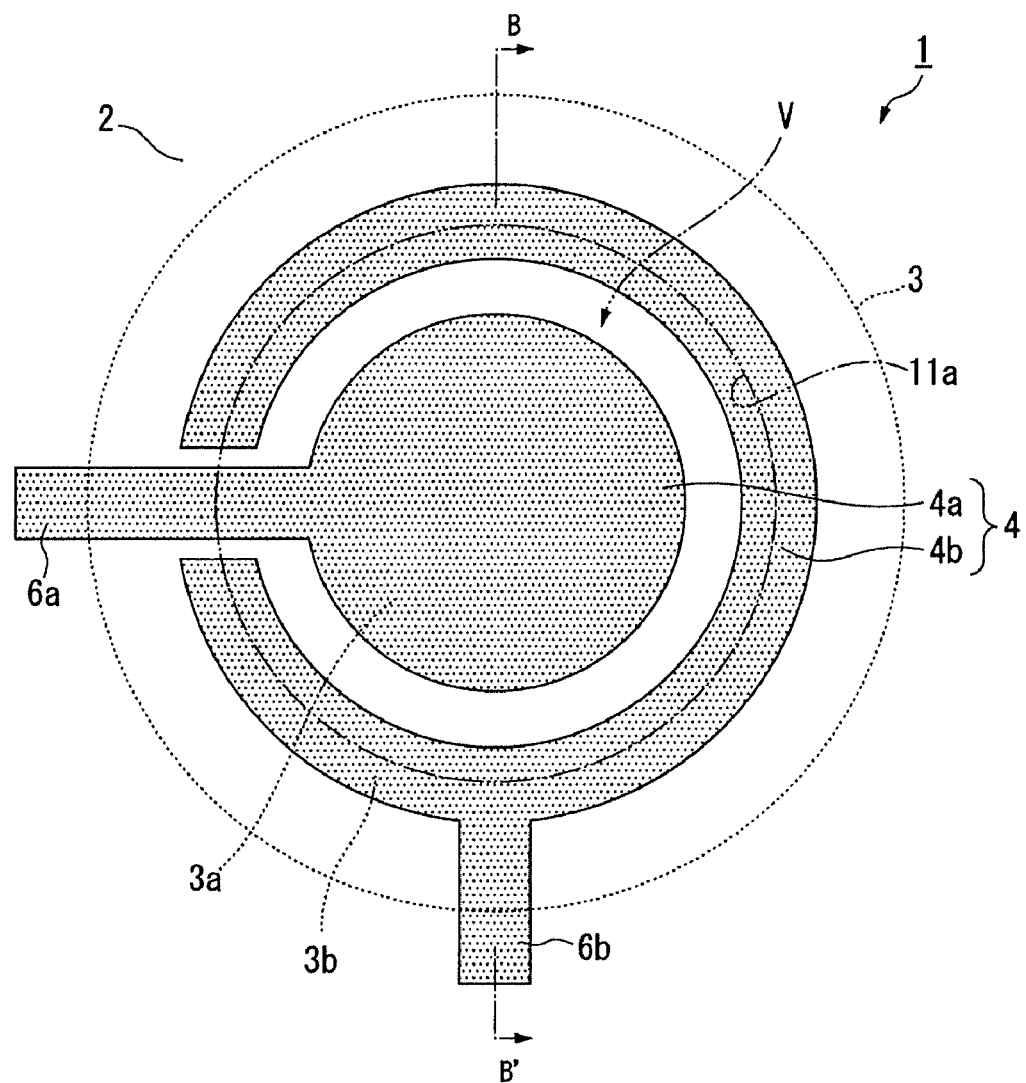
FIG. 5 is a plan of the bottom electrode of the ultrasonic transducer shown in FIG. 4.

A first embodiment of the present invention is illustrated below with reference to drawings. In the following figures, the scale of the layers and members has been modified as needed to ensure that each layer and member is large enough to be seen in the figures.

FIG. 1 is a perspective view schematically representing the structure of a PDA (Personal Data Assistant) 100 in the present embodiment. FIG. 2 is an exploded perspective view schematically representing the structure of an ultrasonic device 50 provided to the PDA 100 in the present embodiment. FIG. 3 is a system configuration diagram schematically representing the structure of the controller 40 (control unit) of the ultrasonic device 50 in the present embodiment. FIG. 3 does not show the structure for applying constant voltage to the second bottom electrode described below.

As shown in FIG. 1, the main body 30 of the PDA 100 in the present embodiment has a display 20. The display 20 is composed, for example, of a liquid crystal panel or organic EL panel, is connected to a computer/controller housed inside the main body 30, and displays various operating images or other data. An ultrasonic device 50 is provided on the circumference of the main body 30. The ultrasonic device 50 functions as an input device that detects the configuration or operation of a human hand, finger, or input pen, for example, for input to the PDA 100.

As shown in FIG. 2, the ultrasonic device 50 has a base 11 in which a plurality of openings 11a is formed in an array. The base 11 is formed from a single crystal silicon substrate, for example. An ultrasonic transducer 1 is provided in each opening 11a. That is, the ultrasonic transducer array 10 is configured so as to have a plurality of ultrasonic transducers 1 disposed in an array on one side of the base 11. The ultrasonic device 50 also has a controller 40 for controlling the ultrasonic transducer array 10.

Wires (not shown) are connected to each of the individual ultrasonic transducers 1, and each wire is connected to a terminal 13a on a control board 13 via a flexible printed board 12 connected to the base 11. The controller 40, which is composed of a computer, memory, and the like, is provided to the control board 13. The controller 40 is composed in such a way as to control input signals input to the ultrasonic transducers 1 and to process output signals output from the ultrasonic transducers 1.

As shown in FIG. 3, the controller 40 is connected to the ultrasonic transducer array 10, and is primarily equipped with a control/computing unit 41, memory 42, ultrasonic generator 43, ultrasonic detector 44, and T/R switch 45 for switching between transmission and reception. The ultrasonic generator 43 is composed of a sine wave generator 43a for generating sine waves, a phase shifter 43b that is provided for the individual ultrasonic transducers 1 and that changes the phase of sine waves, and a driver 43c. The ultrasonic detector 44 is composed primarily of an amplifier 44a and an A/D converter 44b.

In the control/computing unit 41, sine waves are generated by the sine wave generator 43a during ultrasonic emission by the ultrasonic transducer array 10, and the phase shifter 43b changes the sine waves to phases corresponding to the individual ultrasonic transducers 1. When an ultrasonic wave is received by the ultrasonic transducer array 10, the control/computing unit 41 also switches the T/R switch 45 and sends output signals output from the ultrasonic transducer array 10 to the amplifier 44a. The control/computing unit 41 is also configured so as to be capable of outputting data stored in the memory 42 to the control/computing unit (not shown) of the PDA 100. The control/computing unit 41 also has a first controller 41a (first control part) and a second controller 41b (second control part).

FIG. 4 is an enlarged cross sectional view in which the ultrasonic transducer array 10 shown in FIG. 2 is cut along line A-N, and one ultrasonic transducer 1 is enlarged. FIG. 5 is a plan of the bottom electrode of the ultrasonic transducer 1. The cross sectional view of FIG. 4 also corresponds to the cross section along line B-B' in FIG. 5.

In FIG. 2, the shape of the openings 11a provided in the base 11 is represented in the form of squares, as viewed in a plane, but in the following description, the shape of the openings 11a will be round, as viewed in a plane.

The ultrasonic transducer 1 in the embodiment shown in FIG. 4 is an ultrasonic transducer that transmits or receives ultrasonic waves. The ultrasonic transducer 1 has a base 11 in which an opening 11a is formed, a diaphragm 2 (vibrating member) provided so as to block the opening 11a of the base 11, a piezoelectric member 3 provided on the other side of the diaphragm 2 from the base 11, and a bottom electrode 4 and top electrode 5 connected to the piezoelectric member 3.

The opening 11a formed in the base 11 has a depth of about 180 μm to 200 μm, for example.

The diaphragm 2 has a two-layered structure comprising a first oxide film 2a formed with $SiO_2$, for example, that is provided on the base 11 side, and a second oxide film 2b formed with $ZrO_2$, for example, that is laminated on the other side of the first oxide film 2a from the base 11. The first oxide film 2a is formed to a thickness of about 3 μm by thermal oxidation of the surface of a single-crystal silicon substrate, for example. The second oxide film is formed to a thickness of about 400 nm, for example, by CVD (chemical vapor deposition), for example.

The region where the diaphragm 2 overlaps the opening 11a when viewed in a direction perpendicular to a main surface of the diaphragm 2, and is exposed to the opening 11a is the oscillation region V of the diaphragm 2. The diameter D of the opening 11a is set as needed within the range of about 100 μm to hundreds of micrometers, for example, according to the natural frequency of the diaphragm 2 in the oscillation region V.

The bottom electrode 4 is provided in the oscillation region V on the other side of the diaphragm 2 from the base 11.

As shown in FIG. 4 and FIG. 5, the bottom electrode 4 is divided into a first bottom electrode (first electrode) 4a provided in the center of the oscillation region V and a second bottom electrode (second electrode) 4b provided therearound. The first bottom electrode 4a and second bottom electrode 4b are connected to wires 6a and 6b, each of which is connected to the controller 40 of the ultrasonic transducer array 10. The bottom electrode 4 is formed to a thickness of about 200 nm using a conductive metal material such as Ir. The piezoelectric member 3 is provided on the bottom electrode 4 in the oscillation region V and outside the boundary thereof so as to cover the bottom electrode 4.

The piezoelectric member 3 is formed with PZT (lead zirconate titanate) or $BaTiO_3$ (barium titanate), for example, and is composed of a first piezoelectric part 3a in the center and a second piezoelectric part 3b therearound. In other words, the piezoelectric member 3 is integrally formed, and the first bottom electrode 4a and second bottom electrode 4b are separated from each other, so that the portion of the piezoelectric member 3 corresponding to the first bottom electrode 4a is the first piezoelectric part 3a, and the portion of the piezoelectric member 3 corresponding to the second bottom electrode 4b is the second piezoelectric part 3b.

The first piezoelectric part 3a is the middle portion of the piezoelectric member 3 connected to the first bottom electrode 4a. The first piezoelectric part 3a is for vibrating the diaphragm 2 upon being deformed by applied voltage, or for producing potential difference upon being deformed by the vibration of the diaphragm 2.

The second piezoelectric part 3b is the circumferential portion of the piezoelectric member 3 connected to the second bottom electrode 4b. The second piezoelectric part 3b is deformed by applied voltage to statically deflect the diaphragm 2. The second piezoelectric part 3b is provided near the boundary of the oscillation region V so as to straddle the boundary of the oscillation region V.

The top electrode 5 is formed on top of the piezoelectric member 3. The top electrode 5 is formed with a conductive metal material such as Ir, and is connected to the first piezoelectric part 3a and second piezoelectric part 3b. The thickness of the top electrode 5 is about 50 nm, for example. The top electrode 5 is connected via a wire 7 to the controller 40 of the ultrasonic transducer array 10.

The first controller 41a of the control/computing unit 41 shown in FIG. 3 is configured so as to control the ultrasonic generator 43 and T/R switch 45 to control the voltage applied to the first piezoelectric part 3a of the individual ultrasonic transducers 1 (see FIG. 4) provided to the ultrasonic transducer array 10. The first controller 41a is also configured so as to control the T/R switch 45, ultrasonic detector 44, and memory 42 shown in FIG. 3 to process the potential difference produced by the first piezoelectric part 3a shown in FIG. 4.

The second controller 41b of the control/computing unit 41 shown in FIG. 3 is configured so as to control the T/R switch 45 to control the voltage applied to the second piezoelectric part 3b of the individual ultrasonic transducers 1 (see FIG. 4) provided to the ultrasonic transducer array 10.

The control/computing unit 41 shown in FIG. 3 is also configured so as to be capable of independently controlling the first controller 41a and second controller 41b.

The operation of the present embodiment is described next.

As shown in FIG. 1, ultrasonic waves are generated by the ultrasonic device 50 in the detection region when the PDA 100 detects the configuration or operation of a human hand or finger.

First, the controller 40 of the ultrasonic device 50 applies constant voltage across the top electrode 5 and second bottom electrode 4b of transmitting ultrasonic transducers 1. Specifically, the second controller 41b shown in FIG. 3 controls the T/R switch 45 to apply constant voltage across the top electrode 5 and second bottom electrode 4b of the transmitting ultrasonic transducers 1 (see FIG. 4) provided to the ultrasonic transducer array 10. When voltage is applied across the top electrode 5 and second bottom electrode 4b, the second piezoelectric part 3b that has been formed so as to straddle the boundary of the oscillation region V of the diaphragm 2 as shown in FIG. 4 is elongated or compressed in the planar direction of the diaphragm 2 according to the applied voltage.

When the second piezoelectric part 3b is elongated in the planar direction of the diaphragm 2, the piezoelectric member 3 side of the diaphragm 2 is elongated in the planar direction near the boundary of the oscillation region V of the diaphragm 2, and the oscillation region V of the diaphragm 2 becomes convex (convex in the downward direction in the figure) on the base 11 side as shown in FIG. 6(a). When the second piezoelectric part 3b is compressed in the planar direction of the diaphragm 2, the piezoelectric member 3 side of diaphragm 2 is compressed in the planar direction near the boundary of the oscillation region V of the diaphragm 2, and the oscillation region V of the diaphragm 2 becomes concave (convex in the upward direction in the figure) on the base 11 side as shown in FIG. 6(b).

In this way, the voltage applied to the second piezoelectric part 3b of the individual ultrasonic transducers 1 is controlled so that the level and direction of the static deflection of the diaphragms 2 of the various transmitting and receiving ultrasonic transducers 1 are controlled as desired. Here, the deflection of the diaphragm 2 includes not only the phenomenon of the elastic deformation of the diaphragm 2 but also the phenomenon of the changes in the state of the diaphragm 2 stress. The voltage applied to the second piezoelectric parts 3b of the various ultrasonic transducers 1 is also kept constant to maintain the static deflection of the oscillation region V of the diaphragm 2 in the desired configuration.

Next, while the oscillation region V of the diaphragm 2 is statically deflected, the first controller 41a of the controller 40 as shown in FIG. 3 controls the sine wave generator 43a to generate sine waves, and applies sine wave voltage, which is phase-shifted a little at a time, to the first bottom electrode 4a of each of the ultrasonic transducers 1 of the ultrasonic transducer array 10 via the phase shifter 43b, driver 43c, and T/R switch 45. The first piezoelectric parts 3a of the ultrasonic transducers 1 thus expand and contract in the planar direction of the diaphragms 2, and the oscillation regions V of the diaphragms 2 vibrate in the normal direction of the diaphragms 2.

Here, sine wave voltage that is phase-shifted a little at a time is applied to the first bottom electrode 4a of each of the ultrasonic transducers 1. The diaphragm 2 in the oscillation region V of each of the ultrasonic transducers 1 thus vibrates while phase-shifted a little at a time.

The diaphragm 2 in the oscillation region V of each of the ultrasonic transducers 1 vibrates while phase-shifted a little at a time, causing interference in the ultrasonic waves generated by the ultrasonic transducers 1. Due the interference of the ultrasonic waves generated by the ultrasonic transducers 1, the direction in which the ultrasonic waves travel becomes inclined in the normal direction of the diaphragm 2, imparting directionality to the ultrasonic waves.

At this time, the control frequency of the sine wave voltage applied to the first piezoelectric part 3a through the control of the ultrasonic generator 43 by the first controller 41a of the controller 40 is about 100 kHz, for example, and the amplitude is about 10 V. The potential difference of the sine wave voltage applied to the ultrasonic transducers 1 is about 0.5 µs, for example. The voltage (DC potential) applied to the second piezoelectric part 3b through the control of the T/R switch 45 by the second controller 41b of the controller 40 is also about 5 V, for example.

This change in the ultrasonic wave directionality is exploited and the shift in the phase of the sine wave voltage applied to the first piezoelectric parts 3a of the ultrasonic transducers 1 is changed to thereby change the direction of the ultrasonic waves generated by the ultrasonic transducer array 10 of the ultrasonic device 50 shown in FIG. 1 and to scan the detection region of the PDA 100.

At this time, when a human hand or finger, for example, is present in the detection region as shown in FIG. 1, the ultrasonic waves generated by the ultrasonic transducer array 10 are reflected by the human hand or finger. When the ultrasonic waves reflected by the human hand or finger reach the receiving ultrasonic transducers 1 of the ultrasonic transducer array 10, the oscillation regions V of the diaphragms 2 of the ultrasonic transducers 1 vibrate. When the oscillation regions V of the diaphragms 2 vibrate, the first piezoelectric parts 3a expand and contract with the expansion and contraction in the planar direction of the diaphragms 2, and the first piezoelectric parts 3a produce a potential difference.

The potential difference produced by the first piezoelectric parts 3a is transmitted in the form of output signals from the ultrasonic transducers 1 to the ultrasonic transducer array 10 by the wiring 6a and 7 connected to the top electrodes 5 and first bottom electrodes 4a. The output signals from the individual ultrasonic transducers 1 to the controller 40 of the ultrasonic transducer array 10 are stored in the memory 42 via the T/R switch 45, amplifier 44a, and A/D converter 44b. The first controller 41a of the control/computing unit 41 calculates and outputs the distance to the human hand or finger in the detection region and the moving speed based on the output signals from the ultrasonic transducers 1 stored in the memory 42.

The hand or finger state and movement are recognized by the computer controller (not shown) of the PDA 100 based on the distance to the human hand or finger and the moving speed input by the ultrasonic transducer array 10, and are compared to pre-registered finger or hand states and movements. If the results of comparison reveal the detected human hand or finger state and movement to be consistent with those that have been pre-registered, the computer controller of the PDA 100 recognizes the human hand or finger configuration or movement as prescribed input and implements a prescribed pre-registered operation such as the display of an image on the display 20, for example.

According to the PDA 100 of the present embodiment, the ultrasonic transducer array 10 can thus function as an input device.

Here, the piezoelectric members 3 of the ultrasonic transducers 1 provided to the ultrasonic transducer array 10 are composed of first piezoelectric parts 3a and second piezoelectric parts 3b. The level and direction of the static deflection of the diaphragms 2 can therefore be controlled by the voltage (DC potential) applied to the second piezoelectric parts 3b. Thus, when ultrasonic waves are generated upon the vibration of the diaphragms 2 by the first piezoelectric parts 3a to which sine wave voltage has been applied, the level and direction of the deflection of the diaphragms 2 can be controlled by the second piezoelectric parts 3b to which the DC potential voltage has been applied, and the ultrasonic wave directionality or transmission properties of the ultrasonic transducers 1 can be controlled.

The level and direction of deflection in the diaphragm 2 can also be controlled by the second piezoelectric part 3b to control the state of vibration produced in the diaphragm 2 by the ultrasonic waves incident on the oscillation region V of the diaphragm 2 and to adjust the input signals by changing the voltage produced upon the deformation of the first piezoelectric part 3a. It is thus possible to control the ultrasonic sensitivity and reception properties of the ultrasonic transducers 1.

Figure 6:
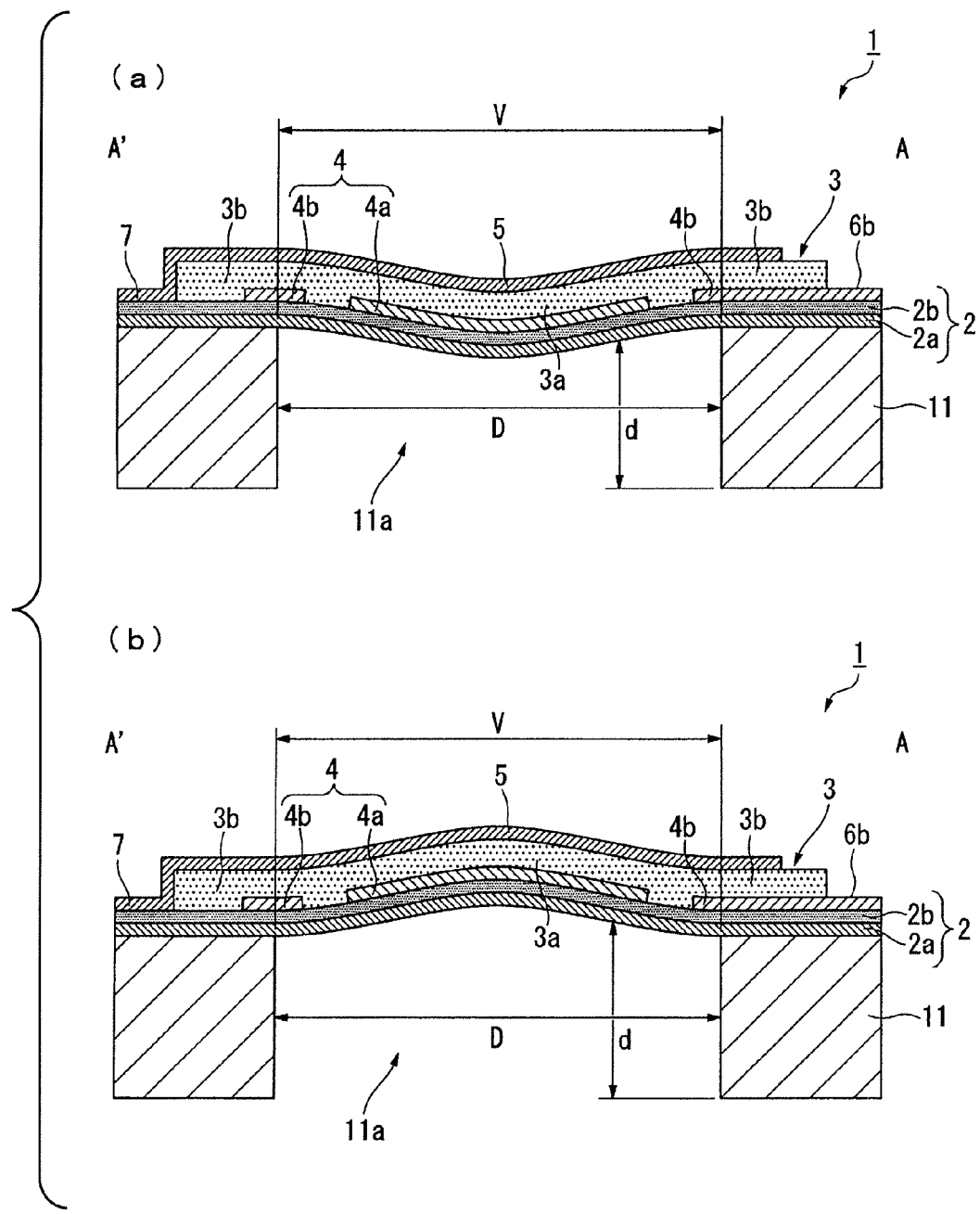
FIGS. 6(a) and 6(b) are cross sectional views in which the diaphragm of the ultrasonic transducer shown in FIG. 4 is shown while deflected.

The diaphragm 2 can also be deflected so as to result in a concave shape on the base 11 side as shown in FIG. 6(*b*) to thereby focus the ultrasonic waves generated by the vibration of the diaphragm 2 and to adjust the ultrasonic wave intensity or distance.

In addition, in the ultrasonic transducer 1 of the present embodiment, the first piezoelectric part 3a and second piezoelectric part 3b are integrated with each other, and the first bottom electrode 4a and second bottom electrode 4b are separated from each other. It is thus possible to apply different voltages to the first piezoelectric part 3a and second piezoelectric part 3b, and to allow the first piezoelectric part 3a and second piezoelectric part 3b to be independently driven. In addition, the potential difference produced by the first piezoelectric part 3a can be detected by means of the diaphragm 2 vibration while the diaphragm 2 is statically deflected by the second piezoelectric part 3b. The piezoelectric member 3 can also be easily manufactured, the ultrasonic transducer 1 productivity can be improved, and the manufacturing costs of the ultrasonic transducer 1 and the ultrasonic transducer array 10 can be reduced.

The diaphragm 2 of the ultrasonic transducer 1 in the present embodiment is also provided in such a way as to block the opening 11a of the base 11, and the first piezoelectric part 3a and second piezoelectric part 3b are provided in the oscillation region V of the diaphragm 2. The diaphragm 2 can thus be supported by the base 11, and only the oscillation region V of the diaphragm 2 will vibrate. The natural frequency of the diaphragm 2 in the oscillation region V can also be adjusted depending on the size and shape of the openings 11a. It is also possible to vibrate the oscillation region V of the diaphragm 2 by means of the first piezoelectric part 3a or to deform the first piezoelectric part 3a by means of the vibration of the oscillation region V of the diaphragm 2 while the oscillation region V of the diaphragm 2 is statically deflected by the second piezoelectric part 3b.

In the ultrasonic transducer 1 of the present embodiment, the first piezoelectric part 3a is provided in the center of the oscillation region V, and the second piezoelectric part 3b is provided around the first piezoelectric part 3a. The circumference of the oscillation region V of the diaphragm 2 can thus be deformed by the second piezoelectric part 3b, and the diaphragm 2 in the oscillation region V can be convexly or concavely deflected on the base 11 side. The convexly or concavely deflected diaphragm 2 can be vibrated by the first piezoelectric part 3a, or the first piezoelectric part 3a can be deformed by the vibration of the convexly or concavely flexed diaphragm 2.

In the ultrasonic transducer 1 in the present embodiment, the second piezoelectric part 3b is also provided near the boundary of the oscillation region V. The diaphragm 2 can thus be deformed in the vicinity of the oscillation region V, and the oscillation region V of the diaphragm 2 can be more efficiently deflected convexly or concavely on the base 11 side.

The ultrasonic device 50 of the present embodiment also has a controller 40 for controlling input signals input to the ultrasonic transducers 1 and for processing output signals output from the ultrasonic transducers 1. This makes it possible to control the frequency or acoustic pressure of the ultrasonic waves generated by the ultrasonic transducers 1. It is also possible to detect and measure ultrasonic waves received by the ultrasonic transducers 1.

In the ultrasonic device 50 of the present embodiment, the controller 40 also has a first controller 41a for controlling the voltage applied to the first piezoelectric part 3a and for processing the potential difference produced by the first piezoelectric part 3a, and a second controller 41b for controlling the voltage applied to the second piezoelectric part 3b. The first controller 41a and second controller 41b can thus be independently operated, and the first piezoelectric part 3a and second piezoelectric part 3b can be independently controlled. The frequencies of the individual transducers 1 can thus be controlled, and variation between the transducers 1 of the transducer array 10 can be corrected.

In the ultrasonic device 50 of the present embodiment, the first controller 41a and second controller 41b are configured to allow independent control. The voltage applied to the second piezoelectric part 3b can thus be controlled by the second controller 41b according to the potential difference of the first piezoelectric part 3a processed by the first controller 41a, and the voltage applied to the first piezoelectric part 3a can be controlled according to the voltage applied to the second piezoelectric part 3b.

For example, feedback control can be implemented, wherein computing functions can be performed by the control/computing unit 41 based on data for ultrasonic waves detected by the first controller 41a, and the results can be reflected in controlling the voltage applied to the second piezoelectric part 3b by the second controller 41b.

As described above, according to the ultrasonic device 50 equipped with the ultrasonic transducer 1 and ultrasonic transducer array 10 of the present embodiment, the sensing properties can be made uniform and stable, and the ultrasonic transmission and reception properties can be easily optimized. Input to the PDA 100 can thus be achieved without contact, and the input can be done easily and reliably.

Second Embodiment

A second embodiment of the present invention is described below with reference to FIGS. 1 through 3, 7, and 8. The ultrasonic transducer 1A in the present embodiment is different from the ultrasonic transducer 1 described in the first embodiment above in that the transducer has a plurality of second bottom electrodes 4b1 through 4b4, and also has a plurality of second piezoelectric components 3b1 through 3b4 corresponding to the second bottom electrodes 4b1 through 4b4. The embodiment is the same as the first embodiment in other respects, and the same parts will therefore be identified by the same symbols without further elaboration.

Figure 8:
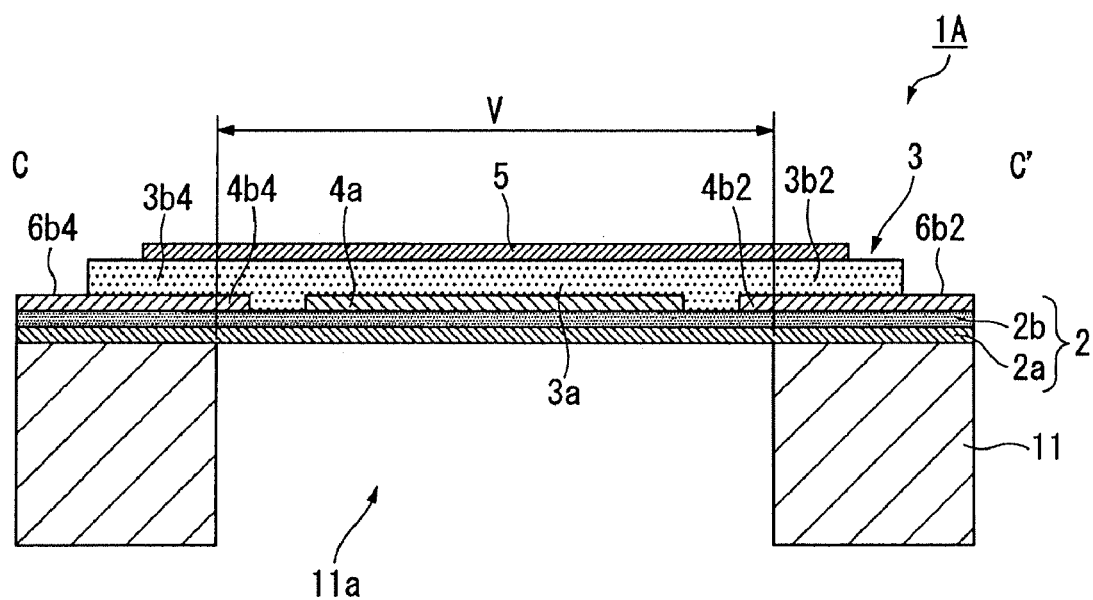
FIG. 8 is a cross sectional view of the ultrasonic transducer in the second embodiment of the present invention.

FIG. 7 is a plan view of the bottom electrode 4A of the ultrasonic transducer 1A in the present embodiment, corresponding to FIG. 5 in the first embodiment. FIG. 8 is an enlarged cross sectional view of the ultrasonic transducer 1A in the present embodiment, corresponding to FIG. 4 in the first embodiment. Here, FIG. 8 is a cross sectional view corresponding to the cross section along line C-C' in FIG. 7.

As shown in FIG. 7, in the ultrasonic transducer 1A of the present embodiment, a first bottom electrode 4a is provided in the center of the oscillation region V of the diaphragm 2 and is connected by a wire 6a to the controller 40. A plurality of second bottom electrodes 4b1 through 4b4 is formed around the first bottom electrode 4a. The second bottom electrodes 4b1 through 4b4 are each connected by wires 6b1 through 6b4, respectively, to the controller 40. The second bottom electrodes 4b1 through 4b4 are also formed near the boundary of the oscillation region V of the diaphragm 2 so as to straddle the boundary.

As shown in FIG. 8, the portions flanked by the second bottom electrodes 4b1 through 4b4 and the top electrode 5 are second piezoelectric components 3b1 through 3b4 in the present embodiment. That is, the ultrasonic transducer 1A in the present embodiment has a plurality of second piezoelectric components 3b1 through 3b4 corresponding to the plurality of second bottom electrodes 4b1 through 4b4.

The operation of the present embodiment is described next.

Figure 9:
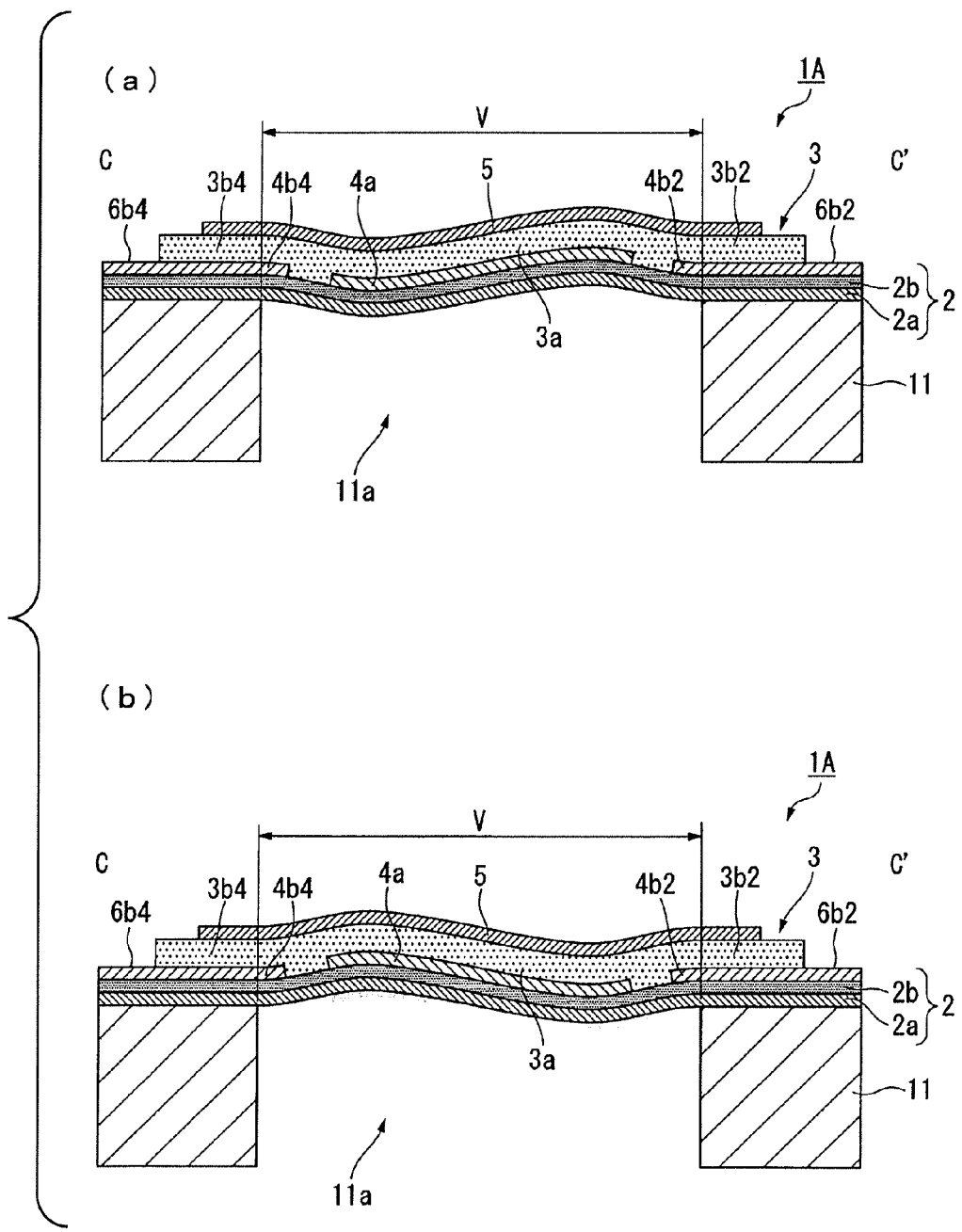
FIGS. 9(a) and 9(b) are cross sectional views in which the diaphragm of the ultrasonic transducer shown in FIG. 8 is shown while deflected.

The incline of the oscillation region V of the diaphragm 2 can be reversed, as shown in FIG. 9(b), when the second piezoelectric component 3b2 is elongated in the planar direction of the diaphragm 2 as voltage is applied across the top electrode 5 and second bottom electrode 4b2, and the second piezoelectric component 3b4 is compressed in the planar direction of the diaphragm 2 as voltage is applied across the top electrode 5 and the second bottom electrode 4b4. Similarly, no voltage is applied to the second bottom electrode 4b1 and second bottom electrode 4b3 at this time.

In this way, the incline direction and angle of the oscillation region V of the diaphragm 2 can be freely controlled within a prescribed range by selecting the second piezoelectric components 3b1 through 3b4 to which voltage is applied and by controlling the DC voltage applied to the individual second piezoelectric components 3b1 through 3b4. It is thus possible to more freely change the ultrasonic transmission and reception directions, and to more easily optimize the properties of the individual ultrasonic transducers 1. The frequencies of the individual transducers 1 can thus be controlled, and variation between the transducers 1 of the ultrasonic transducer array 10 can be corrected.

Variants of the ultrasonic transducer 1 described in the first embodiment above are described below.

Figure 10:
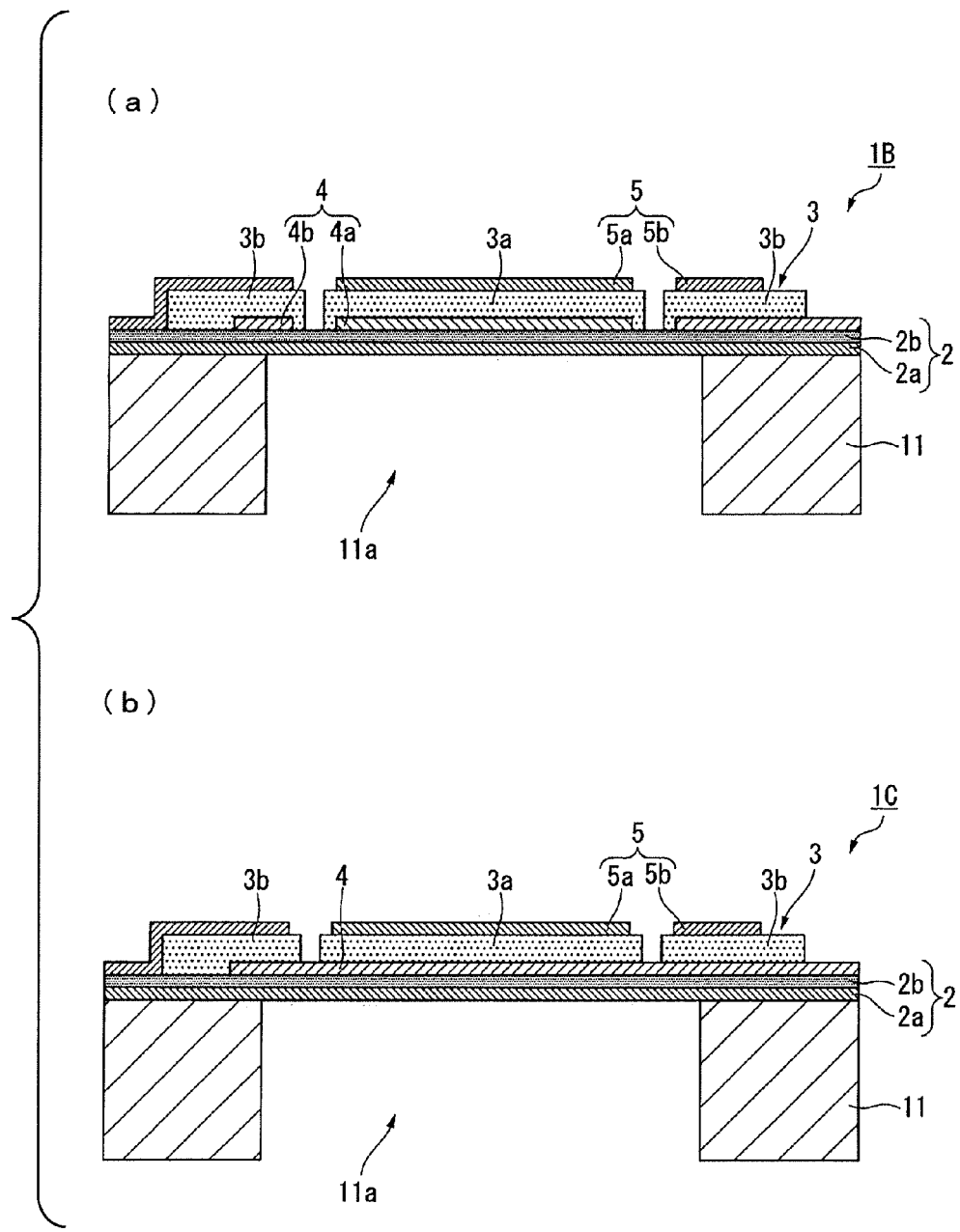
FIGS. 10(a) and 10(b) are cross sectional views showing variants of the ultrasonic transducer shown in FIG. 2.

FIGS. 10(a) and 10(b) are enlarged cross sectional views, corresponding to FIG. 4 of the first embodiment, which show variants of the ultrasonic transducer 1.

As shown in FIG. 10(a), the first piezoelectric part 3a and second piezoelectric part 3b are separately formed in addition to the bottom electrode 4 in the ultrasonic transducer 1 described in the first embodiment. In addition, an ultrasonic transducer 1B may be formed by separating the top electrode 5 in correspondence to the first piezoelectric part 3a and second piezoelectric part 3b.

This will allow the first piezoelectric part 3a and second piezoelectric part 3b to be driven completely independently of each other, and will allow each to be operated independently. It is thus possible to prevent the sensing and oscillation of the first piezoelectric part 3a from unnecessarily affecting the expansion and contraction of the second piezoelectric part 3b.

As shown in FIG. 10(b), an ultrasonic transducer 1C may be formed by integrally forming the bottom electrode 4 in the ultrasonic transducer 1 described in the first embodiment, and separating the top electrode 5 into a first top electrode 5a and second top electrode 5b in correspondence to the first piezoelectric part 3a and second piezoelectric part 3b. This can provide the same effects as the ultrasonic transducer 1 of the first embodiment.

The present invention is not limited to the embodiments above, and various changes can be made without departing from the scope of the invention. For example, the planar shape of the openings formed in the base is not limited to square or round shapes.

Also, the second piezoelectric part may be provided in the center of the oscillation region of the diaphragm, and the first piezoelectric part may be provided around the second piezoelectric part.

The bottom electrode provided near the boundary of the oscillation region of the diaphragm may also be provided on the outside of the boundary in such a way that the end overlaps the boundary, and may be provided on the inside of the boundary in such a way that the end overlaps the boundary. The electrode may also be provided inside or outside the oscillation region, without the end overlapping the boundary.

The first piezoelectric part may also be divided into a plurality of components.

The individual ultrasonic transducers of the ultrasonic transducer array may also both transmit and receive, without being divided into those for transmission and those for reception.

The PDA may also have a plurality of ultrasonic transducer arrays.

An ultrasonic device having a plurality of ultrasonic transducers was described in the embodiments above, but needless to say, the present invention is also applicable to ultrasonic devices composed of a single ultrasonic transducer and controller.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An ultrasonic transducer configured to transmit or receive ultrasonic waves, the ultrasonic transducer comprising:
    a vibrating member; and
    a piezoelectric member coupled to the vibrating member, the piezoelectric member including
        a first piezoelectric part configured and arranged to be deformed by applied voltage to vibrate the vibrating member or configured and arranged to be deformed by vibration of the vibrating member to produce a potential difference, and
        a second piezoelectric part configured and arranged to be deformed by applied voltage to statically deflect the vibrating member.

2. The ultrasonic transducer according to claim 1, wherein the first piezoelectric part and the second piezoelectric part are integrally formed with each other, the first piezoelectric part being connected to a first electrode and the second piezoelectric part being connected to a second electrode with the first electrode and the second electrode being separated from each other.

3. The ultrasonic transducer according to claim 1, further comprising
    a base having an opening,
    the vibrating member covering the opening of the base, and
    the first and second piezoelectric parts being disposed on one side of the vibrating member opposite from the base, the first and second piezoelectric parts being disposed in an oscillation region that overlaps the opening of the base when viewed in a direction perpendicular to a main surface of the vibrating member.

4. The ultrasonic transducer according to claim 3, wherein the first piezoelectric part is disposed in a center portion of the oscillation region, and the second piezoelectric part is disposed on the periphery of the first piezoelectric part.

5. The ultrasonic transducer according to claim 3, wherein the second piezoelectric part is disposed adjacent to a boundary of the oscillation region.

6. The ultrasonic transducer according to claim 1, wherein the second piezoelectric part includes a plurality of piezoelectric components.

7. An ultrasonic transducer array including a plurality of the ultrasonic transducers according to claim 1.

8. An ultrasonic device comprising:
    the ultrasonic transducer according to claim 1; and
    a control unit configured to control input signals input to the ultrasonic transducer and to process output signals output from the ultrasonic transducer.

9. The ultrasonic device according to claim 8, wherein the control unit has a first control part configured to control the voltage applied to the first piezoelectric part and to process the potential difference produced by the first piezoelectric part, and a second control part configured to control the voltage applied to the second piezoelectric part.

10. The ultrasonic device according to claim 9, wherein the first control part and the second control part are configured to be controlled independently from each other.

* * * * *